2,981,215
POWER CONTROL UNIT FOR SEWING MACHINES
Richard P. Graham, Stratford, William L. Herron, Bridgeport, and Stanley J. Ketterer, Stratford, Conn., assignors to The Singer Manufacturing Company, Elizabeth, N.J., a corporation of New Jersey Filed July 20, 1959, Ser. No. 828,110
3 Claims. (Cl. 112—76)

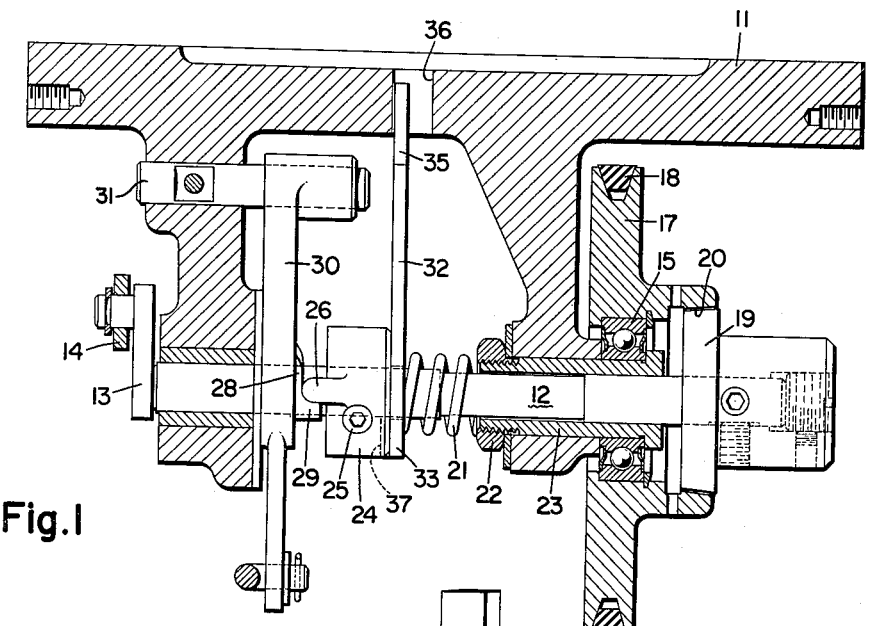
Fig.1
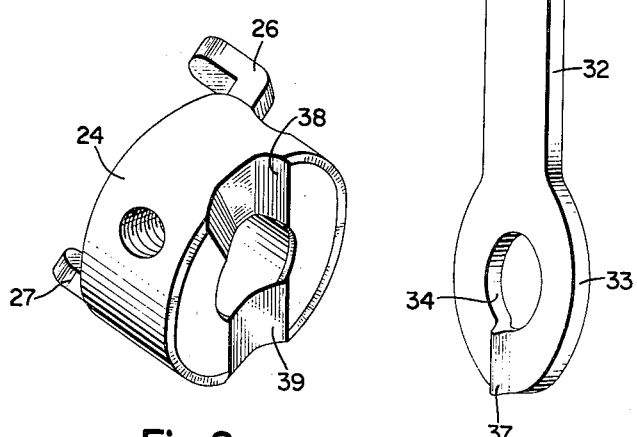
Fig.2
Fig.3
INVENTORS
Richard P. Graham, William L. Herron,
and Stanley J. Ketterer х
United States Patent Office 2,981,215
Patented Apr. 25, 1961

This invention relates to power actuated devices for operating an appurtenance to a sewing machine such as a device for opening and closing a work clamp or the like. More particularly, this invention relates to a power assist device having a spring loaded clutch and means for automatically disengaging the clutch after a fractional revolution thereof.

The spring which biases the clutch toward engaged position must be as heavy as possible to ensure maximum response. The spring, however, gives rise to a frictional force in the latch by which the clutch device is released, and in the prior art a spring heavy enough to deliver the desired quick clutch response will impose excessive effort on the part of the operator in releasing the latch.

It is an object of this invention to provide a construction in which the heavy spring load applied to the clutch device during engagement of the clutch may be appreciably reduced when the clutch is disengaged, thus materially reducing the effort required on the part of the operator in releasing the clutch controlling latch.

It is another object of this invention to increase the speed of operation of a power control unit of the above character. By relieving the spring pressure when the clutch is disengaged, higher spring pressures may be maintained during engagement of the clutch than would have been otherwise possible. The higher spring pressures during engagement of the clutch reduce the recoil of the clutch parts upon engagement and minimizing slippage of the clutch.

With the above objects and advantages in view, as will hereinafter appear, this invention comprises the devices, combinations and arrangements of parts hereinafter described and illustrated in the accompanying drawings of a preferred embodiment in which:

Fig. 1 represents a vertical cross sectional view of a power control unit having the present invention applied thereto, Fig. 2 represents an enlarged perspective view of the shaft collar which carries the stop fingers on the actuating shaft of the power control unit illustrated in Fig. 1, and Fig. 3 represents an enlarged perspective view of the spring control plate illustrated in Fig. 1.

The power control unit illustrated in Fig. 1 is substantially similar to that illustrated and described in detail in the co-pending United States patent application of Graham et al., Serial No. 798,401, filed March 10, 1959, to which reference may be had for a complete understanding of the advantages of the present device.

For comprehension of this invention it is sufficient to understand that in Fig. 1, 11 indicates a frame for the power control unit which may be secured to a sewing machine or beneath a sewing machine supporting table. An actuating shaft 12 journaled in the frame carries a crank 13 which may be connected by a pitman 14 to a work clamp opening linkage or the like. it being the purpose of the power control unit to provide a power operated device for driving the crank into a selected one of two angular positions, one corresponding, for instance, to the raised position of a work clamp and the other to the lowered operative position of the work clamp.

Journaled on a bearing 15 for turning movement coaxially of the actuating shaft 12 is a driving pulley 17 which is driven continuously by a belt 18 from a constant speed motor (not shown). A clutch disk 19 fast on the actuating shaft 12 cooperates with a conical clutch surface 20 formed on the pulley to connect and disconnect the pulley 17 and the actuating shaft 12, depending upon the axial position of the shaft 12.

The shaft 12 is biased by a coil spring 21 to the left, as viewed in Fig. 1. The coil spring 21 acts between a lock nut 22 which secures a bushing 23 to the frame 11 and a shaft collar 24 securely fastened to the shaft 12 by a set screw 25. The coil spring thus biases the shaft toward the engaged position of the clutch.

Stop fingers 26 and 27 formed on the shaft collar are disposed at different distances from the axis of the shaft 12 so as to cooperate alternatively with a cam surface 28 and a stop lug 29 formed on a swinging control member 30 pivoted on a fulcrum pin 31 carried in the frame 11. When either of the stop fingers 26, 27 traverses the cam surface 28, the shaft is moved to the right, as viewed in Fig. 1, and the clutch is disengaged leaving the stop finger against the stop lug 29.

When the control member 30 is shifted to separate the stop lug 29 from the particular finger 26 or 27 in engagement therewith, the spring 21 urges the shaft 12 to the left, thereby clutching the pulley 17 to the shaft 12 and thus driving the shaft until the opposite stop finger engages the cam surface 28 and stop lug 29, following which the shaft is stopped.

The coil spring 21 will be compressed when the fingers 26 and 27 occupy the stopped position and the force exerted by the spring 21 will then ordinarily be the greatest. Conversely, in the running position of the parts, the spring 21 will be relaxed somewhat and in the ordinary construction the force exerted by the spring 21 would be at a minimum in the running position.

It will be apparent that the force exerted by the spring 21, in urging the shaft to the left as viewed in Fig. 1 will determine the normal force acting between the clutch face and the pulley and, therefore, a high spring force is desirable for attainment of quick clutch response in the running position.

It will also be apparent that in shifting the control member 30 to move the cam surface 28 and lug 29 away from a stop finger, the frictional forces which must be overcome result directly from the force exerted by the coil spring 21, and the lower the spring force, the less will be the effort required to shift the control member.

In order to satisfy these two seemingly mutually exclusive considerations, a spring control member, indicated generally as 32, is formed with a washer-like extremity 33 having an aperture 34 disposed on the shaft 12 between the shaft collar 24 and the spring 21. The spring control member 32 is formed with a finger 35 which extends into an aperture 36 formed in the frame 11 to prevent the spring control member 32 from turning with the shaft 12.

The washer-like extremity 33 of the control member 32 is formed with an offset tang 37 extending on the side contiguous to the shaft collar 24. Formed in the face of the shaft collar contiguous to the spring control member are a pair of grooves 38 and 39 disposed to accommodate the tang 37 of the spring control member when the fingers 26, 27, respectively, are disposed against the stop lug 29.

The grooved face of the shaft collar and the spring control member provide a spring pressure controlling cam and follower means. The grooves 38 and 39, in admitting the tang 37, allow the spring control member to move toward the collar when the fingers are disposed against the stop lug 29 and at these times, the coil spring 21 is relaxed and its spring force considerably reduced. The force necessary to shift the control member 30 which is resisted by the friction force between the stop fingers 26 or 27 bearing against the cam 28 and stop lug 29 is thus considerably reduced as is the effort required of the machine operator.

When the control member is shifted to release the shaft collar, initial engagement of the clutch 19—20 under the influence of the reduced spring pressure serves to turn the shaft collar camming the tang 37 out of the cam groove 38 or 39 and thus forces the spring control member away from the shaft collar, considerably increasing the spring force in the coil spring 21 in the running position of the parts.

With this invention, therefore, the spring control member 32 serves to decrease the spring pressure in the stopped position when low spring pressure is advantageous, and to increase the spring pressure in the running position when high spring pressure is advantageous.

Having thus set forth the nature of this invention what we claim herein is:

1. A sewing machine work clamp opening device having a frame, a shaft journaled in said frame for turning and axial sliding movement, means responsive to the angular position of said shaft for opening a sewing machine work clamp, a rotary drive member journaled relatively to said frame coaxially of said shaft, axially disengageable clutch means carried on said shaft and on said rotary drive member, interengaging means carried on said shaft and on said frame for automatically separating said clutch means by shifting said shaft axially in the angular position of said shaft corresponding to the opened position of said sewing machine work clamp, operator influenced means for separating said interengaging means to re-establish engaged relation of said clutch means, a spring means arranged to act between said shaft and said frame for biasing said clutch means axially into engaged position, and means responsive to the angular position of said shaft for reducing the spring pressure in the opened position of said sewing machine work clamp.

2. A sewing machine work clamp device as set forth in claim 1 in which the spring means comprises a coil spring maintained in compression between the frame and a collar fast on said shaft, and in which the means for reducing the spring pressure comprises a spring control member interposed between said compression spring and said collar, means for constraining said spring control member from turning with said shaft, a projection formed on said spring control member and extending axially of said shaft, and said collar being formed with a recess disposed to accommodate the projection of said spring control member in the opened position of said sewing machine work clamp.

3. A sewing machine work clamp opening and closing device having a frame adapted to be supported relatively to the sewing machine, a shaft journaled in said frame for turning and axial sliding movement, crank means fast on said shaft, clamp opening and closing linkage operatively connecting said crank means with said sewing machine work clamp, a rotary drive member journaled relatively to said frame coaxially of said shaft, axially disengageable clutch means carried on said shaft and on said rotary drive member, interengaging clutch controlling cam means carried on said shaft and on said frame for axially separating said clutch means by shifting said shaft axially in the angular position of said shaft corresponding to opened and to closed positions of said sewing machine work clamp, a spring means arranged to act between said shaft and said frame for biasing said clutch means axially into engaged position, operator-influenced means for separating said interengaging cam means to re-establish engaged relation of said clutch means, interengaging spring pressure controlling cam and follower means constrained on said shaft and on said frame, and means for timing said spring pressure controlling cam means relatively to said clutch controlling cam means to reduce the spring pressure in the opened and closed position of said sewing machine work clamp.

References Cited in the file of this patent

UNITED STATES PATENTS

| Number | Name | Date |
| --- | --- | --- |
| 117,708 | West | Aug. 1, 1871 |
| 1,193,008 | Fuller | Aug. 1, 1916 |
| 2,332,743 | Morris | Oct. 26, 1943 |
| 2,367,187 | Collins | Jan. 16, 1945 |
| 2,788,755 | Nichols | Apr. 16, 1957 |

FOREIGN PATENTS

| Number | Country | Date |
| --- | --- | --- |
| 728,714 | France | Apr. 18, 1932 |